(12) United States Patent
Hall, Jr. et al.

(10) Patent No.: US 6,308,281 B1
(45) Date of Patent: Oct. 23, 2001

(54) VIRTUAL CLIENT TO GATEWAY CONNECTION OVER MULTIPLE PHYSICAL CONNECTIONS

(75) Inventors: George E. Hall, Jr., Hillsborough; John D. Kari, Henderson, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/145,521

(22) Filed: Sep. 2, 1998

(51) Int. Cl.[7] ................................................. G06F 13/00
(52) U.S. Cl. ................................................ 714/4; 370/218
(58) Field of Search .................................. 714/4, 5, 6, 8, 714/11, 18, 25, 43, 47; 370/218, 231, 236; 709/228, 229, 226

(56) References Cited

U.S. PATENT DOCUMENTS

| | | | |
|---|---|---|---|
| 5,446,915 | * | 8/1995 | Pierce .................................... 395/800 |
| 5,553,060 | * | 9/1996 | Obermanns et al. ................... 370/16 |
| 5,627,821 | * | 5/1997 | Miyagi .................................. 370/242 |
| 5,627,892 | * | 5/1997 | Kauffman .............................. 380/21 |
| 5,638,358 | * | 6/1997 | Hagi ...................................... 370/228 |
| 5,652,789 | * | 7/1997 | Miner et al. .......................... 379/201 |
| 5,812,784 | * | 9/1998 | Watson et al. ...................... 395/200.57 |
| 5,933,412 | * | 8/1999 | Choudhury et al. ................... 370/218 |
| 6,055,575 | * | 4/2000 | Paulsen et al. ....................... 709/229 |
| 6,088,451 | * | 7/2000 | He et al. ............................... 380/25 |

* cited by examiner

Primary Examiner—Nadeem Iqbal
(74) Attorney, Agent, or Firm—Jeanine S. Ray-Yarletts; Marcia L. Doubet (57) ABSTRACT

A method, system, and computer program by which a logical network connection can be maintained in the presence of disruption or failure of the underlying physical network connection. The technique defines a virtual connection between the client and gateway, which is not dependent upon continuous connectivity in the underlying physical connection, and can resume operation transparently even though the physical connection may be established on a different media type. Additionally, the technique of the present invention enables the physical medium to be changed even though the physical connection was not disrupted. This change in medium may be based on a number of factors, such as quality of service or transmission speed, which can be monitored. A graphical user interface ("GUI") is defined whereby the human user may observe a depiction of the available physical connections and their status, information regarding the physical connection currently in use, etc. The user may initiate changes to the current physical connection from this GUI, without disrupting the logical connection.

18 Claims, 12 Drawing Sheets

VIRTUAL CLIENT TO GATEWAY CONNECTION OVER MULTIPLE PHYSICAL CONNECTIONS

BACKGROUND OF THE INVENTION

1. Field of the Invention

The present invention relates to a computer system, and deals more particularly with a method, apparatus, and computer program for operating the computer system such that a virtual connection between a client and gateway can be supported by multiple physical connections in a manner that is transparent to the user. The physical connection may change in response to a number of factors. A graphical user interface is defined which enables the user to monitor connection information.

2. Description of the Related Art

Connecting a computer workstation through a network to a remote host is commonplace today. Many connection techniques can be used, such as: using the workstation's modem to establish a connection over a telephone line; using a Local Area Network (LAN) card such as Token Ring or Ethernet; using a suitable device to establish a wireless connection; etc. The workstation may be any type of computer processor, including laptop, handheld or mobile computers, vehicle-mounted devices, desktop computers, mainframe computers, etc., having processing and communication capabilities. The remote host, similarly, can be one of any number of different types of computer which have processing and communication capabilities. These techniques are well known in the art, and the hardware devices and software which enable their use are readily available. Hereinafter, use of the terms "workstation" or "host" refers to any of these types of computing devices.

When the workstation connects to a remotely-located host, it is necessary to establish connections across one or more networks, which may be LANs or Wide Area Networks (WANs). As used herein, the device that originates the connection will be referred to as the "client", and the device that receives this request will be referred to as the "gateway". A gateway computer (that is, gateway functionality implemented in a computer) is used as a point of entrance into a network, providing the ability for messages to flow between the client and the gateway as a logical end-to-end communication. A network may be accessible through one or more gateway machines. Often, the client will be a mobile device. Many clients may connect to a network through a given gateway.

Currently, the connection between a client and the gateway to which it connects is made using a specific predetermined physical connection. The connection may use a wired medium, or it may use a wireless medium. (Note that a wireless connection will be referred to herein as using a "physical" connection, although that connection may use radio waves, microwaves, etc., for ease of reference in distinguishing this "underlying" connection from the higher-level logical connection that runs over it.) For example, a wired connection may be made over a public switched telephone network (PSTN), etc. A wireless connection may be made using a number of alternative technologies, such as cellular telephone, packet radio network (which may in turn be a public network, or a private network), satellite, microwave, etc. The physical connection may be made during the process of establishing a TCP/IP (Transmission Control Protocol/Internet Protocol) connection. This TCP/IP connection (hereinafter, the "logical connection") then enables applications running on the client and gateway machines to exchange messages in a meaningful way. However, this logical TCP/IP connection is limited to use of one underlying physical connection for the duration of the logical connection. If the physical connection is disrupted (for example, the connection drops or degrades beyond a predefined tolerance), the TCP/IP implementation will end the logical connection. To continue communicating, the client and gateway must begin the connection establishment process anew. This can be very time-consuming, as it may involve a number of processes from detecting an available physical medium (as an alternative, when the prior medium has failed) to performing complicated application-specific requirements such as authentication and negotiation of communication parameters. In addition, disruptions in communications may increase the likelihood of loss of data upon which the application was operating. And, if human users are interacting with the application, such disruptions can cause a great deal of frustration and annoyance.

Some techniques such as "Short-Hold Mode" from the International Business Machines Corporation ("IBM") are known which provide for continuing the logical connection when the physical connection has been disrupted, but the known techniques require reestablishment of a physical connection using the identical type of connectivity. This restriction may completely prevent reestablishing the connection—for example, when a physical device such as the modem has failed—even when a number of other media may be available that could connect the client and gateway. Further, this restriction does not enable the possibility of changing to a different media that may be preferable under changed circumstances. Suppose, for example, that a thunderstorm is causing intolerable noise on the telephone lines which were being used. While a connection can be reestablished over the phone lines, it may be preferable to change to some other available media such as wireless packet radio or other wired connections that may perform better in these circumstances.

Accordingly, a need exists for a technique by which a logical network connection can be maintained in the presence of disruption or failure of the underlying physical network connection. This technique must enable the subsequent physical connection to use a different physical medium, while still retaining the state and data of the application intact in a manner that is transparent to the user. The proposed technique defines a virtual connection between the client and gateway, which is not dependent upon continuous connectivity in the underlying physical connection, and can resume operation even though the physical connection may be established on a different media type. Additionally, the technique of the present invention enables the physical medium to be changed even though the physical connection was not disrupted. This change in medium may be based on a number of factors, such as quality of service or transmission speed, which can be monitored. A graphical user interface ("GUI") is defined whereby the human user may observe a depiction of the available physical connections, their respective status information, and further information regarding the specific physical connection currently in use, etc. Further, this GUI will permit the human user to initiate a change in the physical connection being used, without disruption in the logical connection.

SUMMARY OF THE INVENTION

An object of the present invention is to provide a technique whereby a logical network connection can be maintained transparently in the presence of disruption or failure of the underlying physical network connection.

Another object of the present invention is to provide a technique whereby the subsequent physical connection can use a different physical medium, while still retaining the state and data of the application intact.

A further object of the present invention is to provide a technique whereby the physical medium underlying the logical connection may be changed even though the physical connection was not disrupted.

Additionally, it is an object of the present invention to provide a technique whereby this change in medium may be based on a number of factors, such as quality of service or transmission speed.

A further object of the present invention is to provide a graphical user interface whereby the human user may observe a depiction of the available physical connections and their status, information regarding the physical connection currently in use, etc., and may initiate changes to the physical connection (without disrupting the logical connection).

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for maintaining a virtual connection between a client and a gateway across multiple physical connections in a computing environment capable of having a connection to a network. This comprises: establishing a first connection using a first of at least one available connection media and a first of at least one available connection devices; establishing a second connection using a second of the connection media and a second of the connection devices, wherein at least one of the second medium and the second connection device is different from the first medium and the first connection device; and maintaining a logical connection between the client and the gateway, wherein the logical connection is supported by the first connection and the second connection. Preferably, this further comprises: sending a session key from the client to the gateway using the second connection, wherein the session key identifies the logical connection and was created when using the first connection; and receiving the session key in the gateway, and detecting the receipt as a request to continue the logical connection. A graphical user interface is preferably available, which depicts: a graphical representation of the client and the gateway, the available connection media, and the available connection devices; a status of each of the media and the devices; and an indication of which of the media and the devices is currently in use. The second connection may be established in response to a disruption or failure of the first connection, in response to detection of a better connection choice than the first connection, or in response to a request by a user, where this request is initiated by user input from the graphical user interface.

The present invention will now be described with reference to the following drawings, in which like reference numbers denote the same element throughout.

DESCRIPTION OF THE PREFERRED EMBODIMENT

Figure 1:
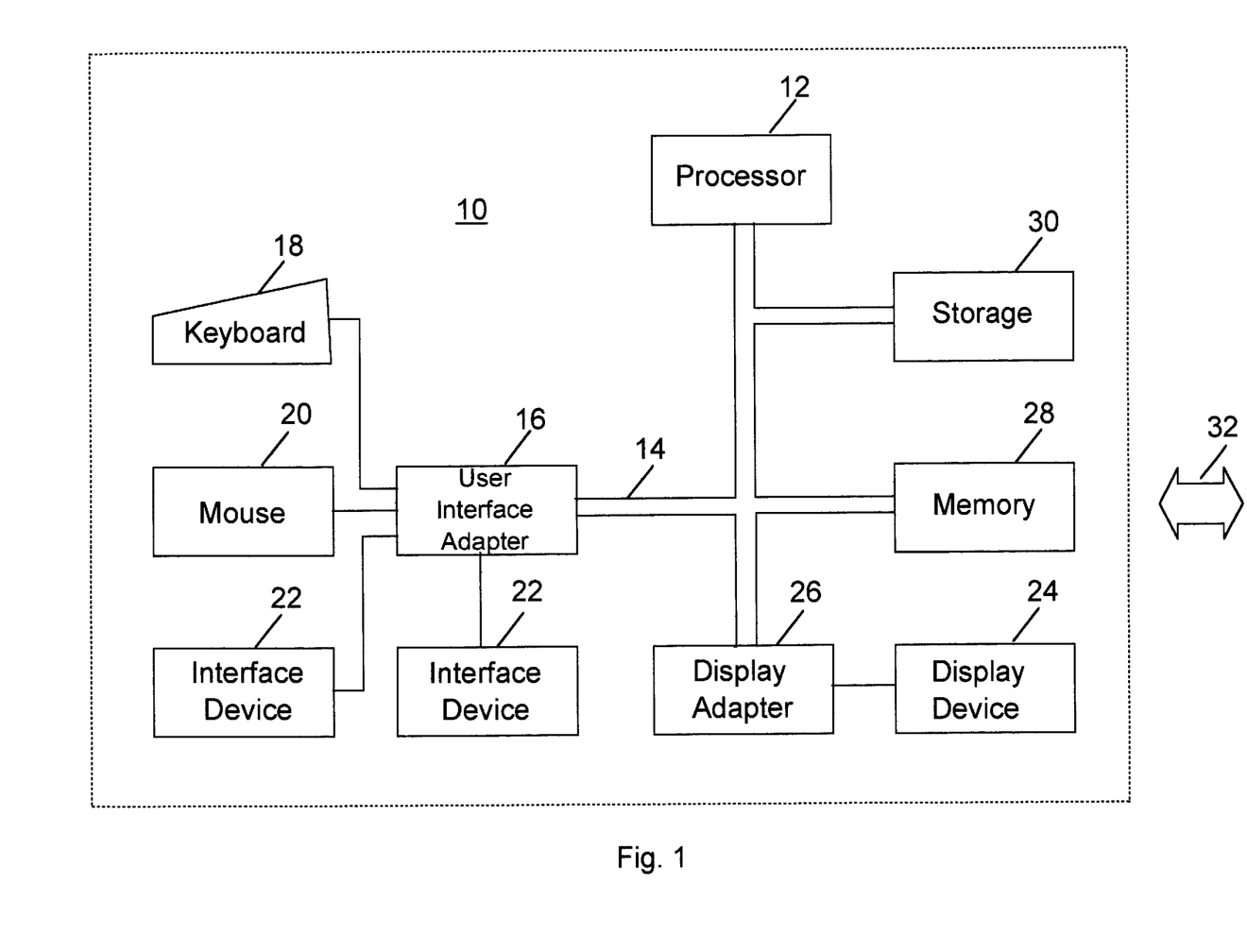
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. the workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel or modem 32 with other computers or networks of computers. Alternatively, the workstation 10 may communicate using a wireless interface at 32, such as a CDPD (cellular digital packet data) card. The workstation 10 may be associated with such other computers in a LAN or a WAN, the workstation 10 can be a client in a client/server arrangement with another computer, etc. All of these configurations, as well as the appropriate communications hardware and software, are known in the art.

Figure 2:
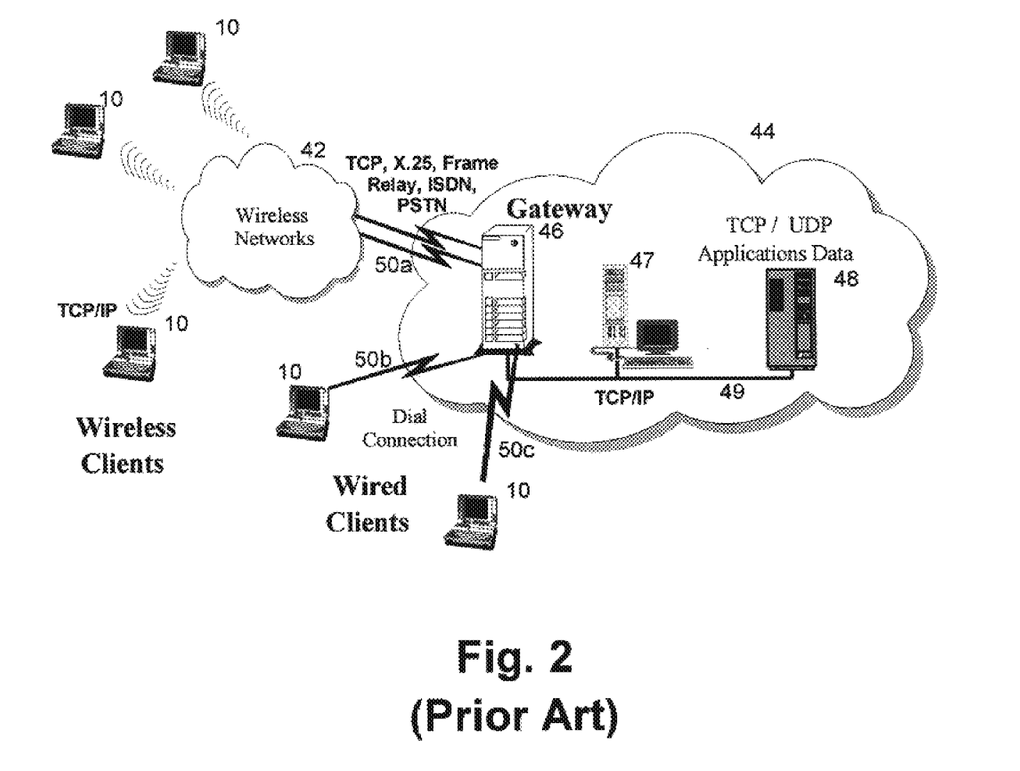
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 48. The gateway 46 may also be directly coupled to one or more workstations 10 using a communications link 48. The gateway computer 46 may be implemented utilizing an Enterprise Systems Architecture/370, an Enterprise Systems Architecture/390 computer available from IBM, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the TCP/IP protocol over a number of alternative connection media, such as cellular phone, radio frequency networks, satellite networks, etc. The wireless network 42 preferably connects to the gateway 46 using a network connection 50a such as TCP or UDP over IP, X.25, Frame Relay, ISDN, PSTN, etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and gateway 46 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The graphical user interface defined for the present invention may be displayed on any of the various display devices 24. The user interacts with this displayed data using any type of interface device such as a keyboard 18, mouse 20, and/or other interface devices 22 (such as a touch sensitive screen, digitized entry pad, etc.).

The preferred embodiment of the present invention will now be discussed with reference to FIGS. 3 through 8.

In the preferred embodiment, the present invention is implemented as a computer software program. The implementation of the logic for the client (see FIG. 6) may be separate from the implementation of the logic for the gateway (see FIG. 7), or the logic for both may be implemented together.

Figure 3:
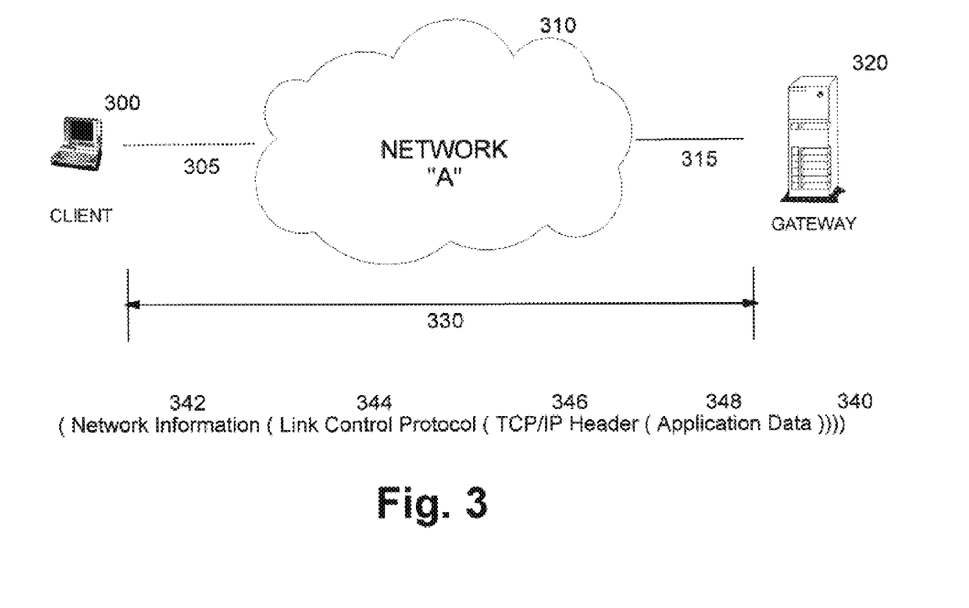
FIG. 3 depicts, at a high level, an existing (physical and logical) network connection between a client and a gateway.

FIG. 3 depicts a client 300 connected to a gateway 320, using a connection 305, 315 through a network "A" 310. This figure illustrates the prior art technique used by existing client and gateway software, whereby a single physical (wired or wireless) and logical network connection 305, 315 through a specific network 310 between the client and the gateway is used for the duration of the logical connection. As previously described, the physical connection 305, 315 through a network 310 may be reestablished in the prior art after a disruption, while still continuing the logical connection, although the same physical medium must be used. The present invention allows the physical connection 305, 315 and/or the network 310 to change, as will be described in further detail below.

FIG. 3 also depicts the virtual connection 330 defined by the present invention, and an abstract representation 340 of the data stream format that enables the client and gateway to continue a logical connection across multiple physical connections. The virtual connection 330 extends from the client 300 to the gateway 320, without regard to the type of network 310 or medium used for connections 305, 315. The data stream 340 is comprised of the application specific data 348, which is encapsulated by a TCP/IP header 346 according to techniques which are known in the art. This data is further encapsulated in a Link control protocol ("LCP") packet 344, which is encapsulated within a network information packet 342, also using well-known techniques. The present invention uses existing information in the LCP packet 344, defining new semantics for that information to enable association of a new physical connection with an existing logical connection, as further described below with reference to FIGS. 6 and 7. In the prior art, the LCP information 344 and network information 342 go together—that is, the LCP information 344 is tightly coupled to the underlying physical network and its network information 342. As different physical network connections are established using the present invention, however, the network information 342 varies according to the specific network connection while the information in LCP 344 enables maintaining the logical TCP/IP connection, as represented by the TCP/IP header 346.

Figure 4:
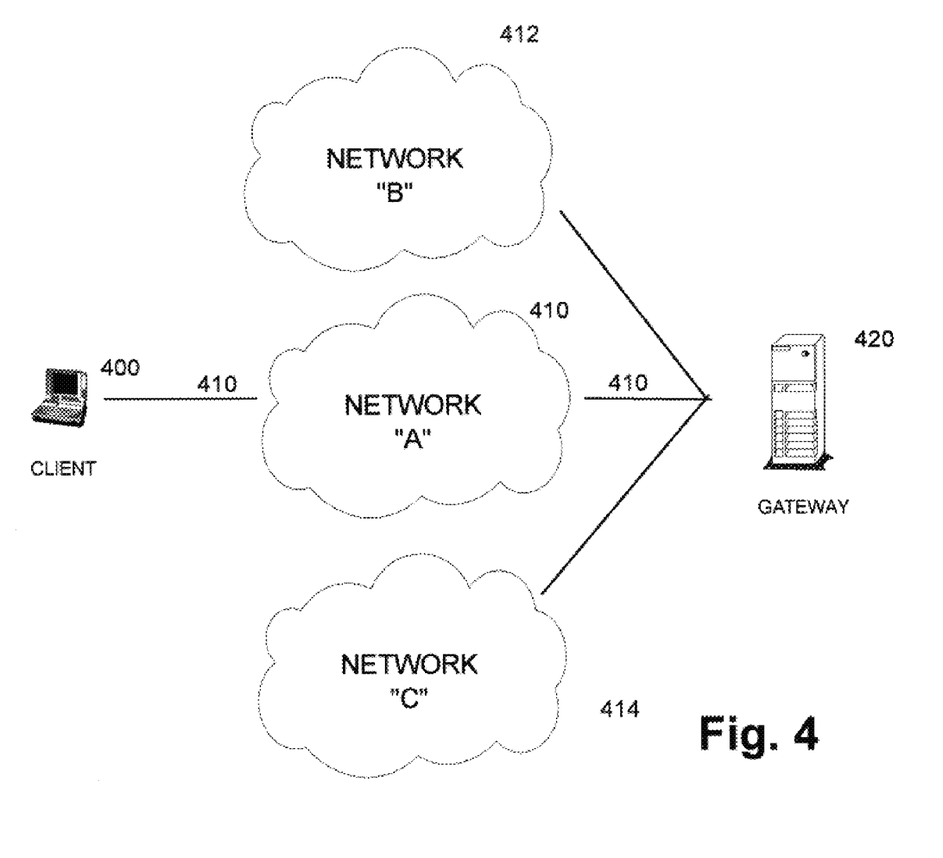
FIG. 4 illustrates the availability of alternative physical network connections by which the gateway may be reached from this client.

FIG. 4 illustrates the availability of alternative physical network connections 412, 414 through networks "B" and "C", respectively, by which the gateway 420 may be reached from this client 400 if the physical connection 410 through network "A" is unavailable. These alternative connections 412, 414 may also be used if connection 410 is less desirable in view of factors such as line speed, bandwidth, cost of service, etc. In the prior art, the physical connection 410, 412, or 414 to be used must be selected in advance by client 400. The present invention removes this restriction, enabling use of any of the available connections while transparently maintaining the virtual connection.

Figure 5:
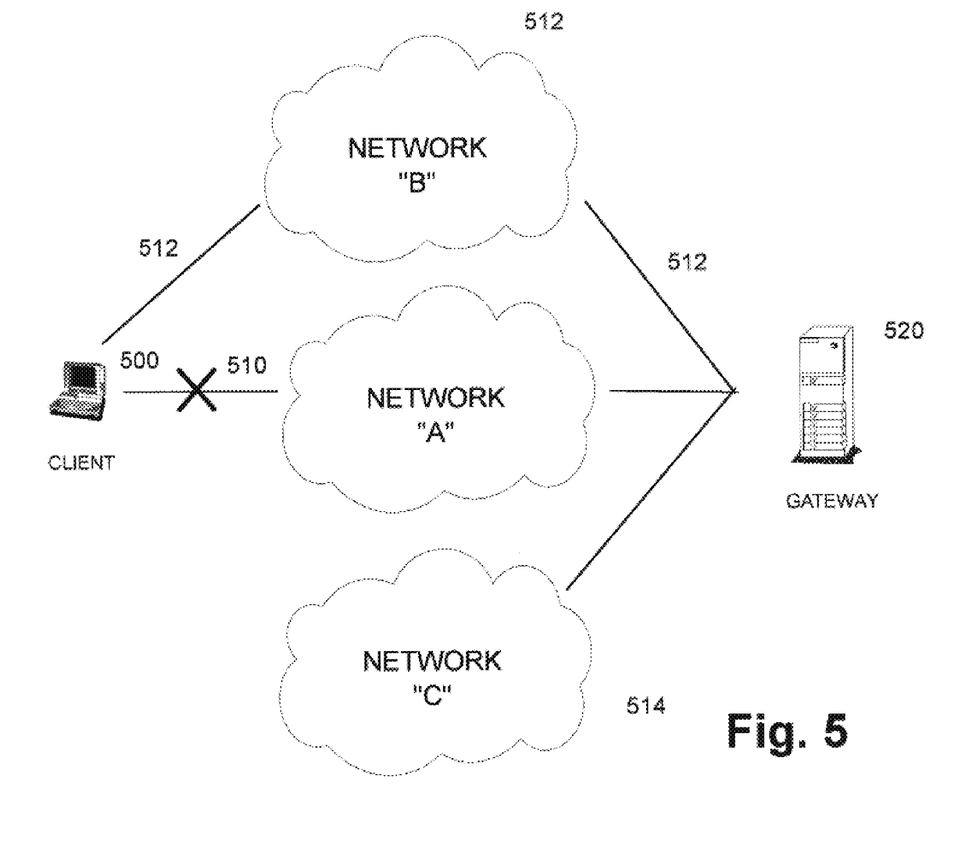
FIG. 5 depicts the capability of dynamically changing the physical connection to the gateway, using a different underlying network which may involve use of different physical media.

FIG. 5 depicts the capability of dynamically changing the physical connection 510 through network "A" from the client 500 to the gateway 520, using a different underlying network "B" 512 which may involve use of different physical media. For example, connection 510 may be a wired connection through a PSTN network, using dial-up telephone medium, while connection 512 may be a different type of wired connection or a wireless connection. According to the virtual connection technique of the present invention, this dynamic change may be made transparently, without disruption to the logical TCP/IP connection between client 500 and gateway 520.

Figure 6:
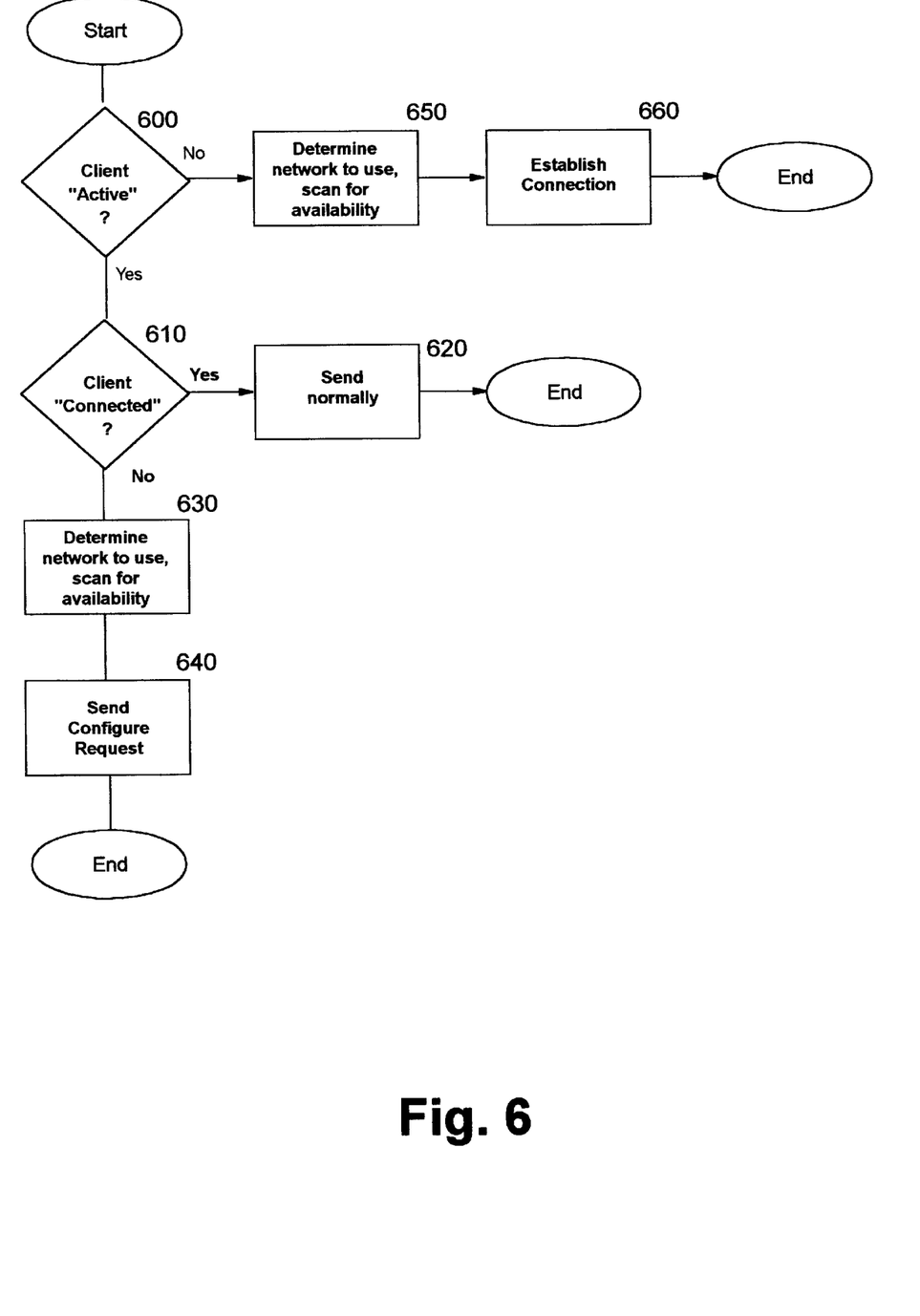
FIG. 6 illustrates a flow chart which sets forth the logic with which a preferred embodiment of the present invention in a client machine maintains a virtual connection across changes in the underlying physical connection.

FIG. 6 illustrates a flow chart which sets forth the logic with which a preferred embodiment of the present invention in a client machine maintains a virtual connection across changes in the underlying physical connection. The process of FIG. 6 depicts the logic that will be invoked when (1) the client initially begins the connection establishment process for a new TCP/IP connection, or (2) the application on the client machine has sent a TCP/IP packet to the client, for sending to the gateway.

The process begins at Block 600, where a test is made by the client software to determine if the client side of the TCP/IP connection is still active. The client will be considered "active" when a session had previously been established with the gateway, and the client implementation believes this session is still valid (e.g. the client has neither sent nor received a disconnect request). When this test has a positive response, Block 610 asks if the client is still connected. The client will be considered "connected" when it still has the ability to communicate with the gateway. For example, when cellular technology is being used, this includes being "in range" of the cellular service; if a dialed telephone connection is being used, this includes being able to get a dial tone on the phone line. When this test also has a positive response, both the physical and logical connections are intact, so Block 620 indicates that the client process operates normally according to the TCP/IP protocol (i.e. the TCP/IP packet will be sent to the gateway). The process of FIG. 6 then ends.

Block 630 is reached when the client is still active, but is no longer connected. In the prior art, the logical TCP/IP connection would also disconnect in this situation, ending this session between the client and gateway. Using the novel techniques of the present invention, a subsequent physical connection will be made, enabling the logical connection to be maintained intact. Further, the logical connection is maintained in a manner that is transparent to the user.

Block 630 indicates that the client software will now make a determination of the technique to be used for this subsequent physical connection. A number of factors may be considered in this selection process. In one aspect of the preferred embodiment, a user profile may store one or more user preferences, which may be in descending order of preference. When stored in descending order, a "default" or "most preferable" technique is the first entry in the profile. When a user profile is available, each entry from this profile will be attempted in sequence, until a technique is located which enables a successful physical connection. As shown in Block 630, the preferred embodiment scans for availability of the technique at this point. A looping mechanism may be implemented, whereby a technique is selected from the profile, a scan is performed to determine if this technique is available, and this process repeats until an available technique is found. This scanning process may comprise, for example, checking for the presence of a modem and availability of a dial tone if a telephone connection is to be attempted; checking to see if the client machine is in the coverage range of a wireless technique such as cellular; using different technologies based on the time of day, or the geographic location of the client machine; etc. Alternatively, when a user profile is not available or not used, the techniques which are to be attempted may be coded directly into the client implementation, or may be accessible from a configuration file. Techniques for implementing these alternatives are well known in the art.

Block 640 sends the Configure Request message that is required to establish the subsequent physical connection using the medium selected at Block 630. As stated previously, this may be a different medium than that previously used for this session, and may include changing from a wired connection to a wireless connection or vice versa. The session key (an identifier of the active PPP (Point-to-Point Protocol) session, which was established according to the PPP protocol when the logical connection was originally established) will be transmitted to the gateway in the network information portion 342 of this Configure Request message (using data stream format 340). This enables a gateway implementing the novel technique of the present invention to recognize that a request to resume communicating over a virtual connection after disruption of the underlying physical connection is being attempted. The process of FIG. 6 then ends. (It will be obvious to one of ordinary skill in the art that an acknowledgement message will be returned from the gateway in response to this Configure Request, and if this acknowledgement is positive, the application data which invoked the process of FIG. 6 will be sent by the client at that time. This uses techniques which are known in the art, and does not form part of the present invention.)

Block 650 is reached when the client is no longer active. At Block 650, an identical determination process to that of Block 630 is performed, selecting the technique to be used to establish a subsequent physical connection to the gateway. Control then continues to Block 660, where a new physical and logical connection will be set up. This process uses techniques which are known in the art, and comprises performing any authentication that is required, followed by any negotiation (which may include negotiating the use of encryption and compression techniques), as well as exchanging the IP address to be used for communicating. Once these processes have completed successfully, the connection is set up and communication over a new session can begin. The process of FIG. 6 then ends.

In a further aspect of the preferred embodiment, the process of FIG. 6 may be invoked on a user-configurable basis, even in the absence of disruption to the physical connection. This may be done in order to determine whether a "better" physical connection is available. What constitutes a better connection is also user-configurable, but may include searching for a higher bandwidth if more capacity is needed, or a lower bandwidth if excess capacity currently exists, etc. A timer-driven means may be used to periodically invoke this comparison process, for example using a time interval from a system or user profile. The profile may indicate that the comparison should be invoked every 15 minutes, or some shorter or longer time period, including the possibility of some alternative time units. Alternatively, specific criteria may be used such as exceeding a transmission threshhold value, passing from one time-of-day period where telephone transmission rates are high into another period where rates are lower, etc. When this aspect is implemented, the comparison process will be performed between Blocks 610 and 620, when the test in Block 610 has a positive response. The comparison process will search for a better physical connection: if none is found, the existing connection will remain in use, and any data to be transmitted will be sent normally at Block 620. Otherwise, when a better connection is found, control will transfer from this additional comparison process to the process of Block 640 to send a Configure Request for this better medium.

In yet another aspect of the preferred embodiment, the user may directly initiate a change to the underlying physical connection, causing the process of FIG. 6 to be invoked. FIGS. 8A–8E (discussed in more detail below) illustrate an example GUI that may be used with the present invention. This GUI enables the human user to observe a depiction of the physical connection and alternatives, their respective status information, and further information regarding the specific physical connection currently in use. Further, this GUI will permit the human user to initiate the type of change that invokes the FIG. 6 processing. Alternative methods of allowing the user to cause a change in the physical connection may be used, without deviating from the inventive concepts of the present invention. Such alternative methods include, but are not limited to, providing pop-up or pull-down menus (which may include context-sensitive information) with selectable functions to change connections, defining one or more function keys that may be pressed to change connections, etc. This aspect which supports a user request for a change to the physical connection may be implemented using the flow of FIG. 6, where an additional test is inserted between Blocks 610 and 620. This test asks whether the user requested a change. When the response is negative, control continues to Block 620. When the response is positive, control will transfer from this additional comparison process to the process of Block 640 to send a Configure Request for this changed connection.

Figure 7:
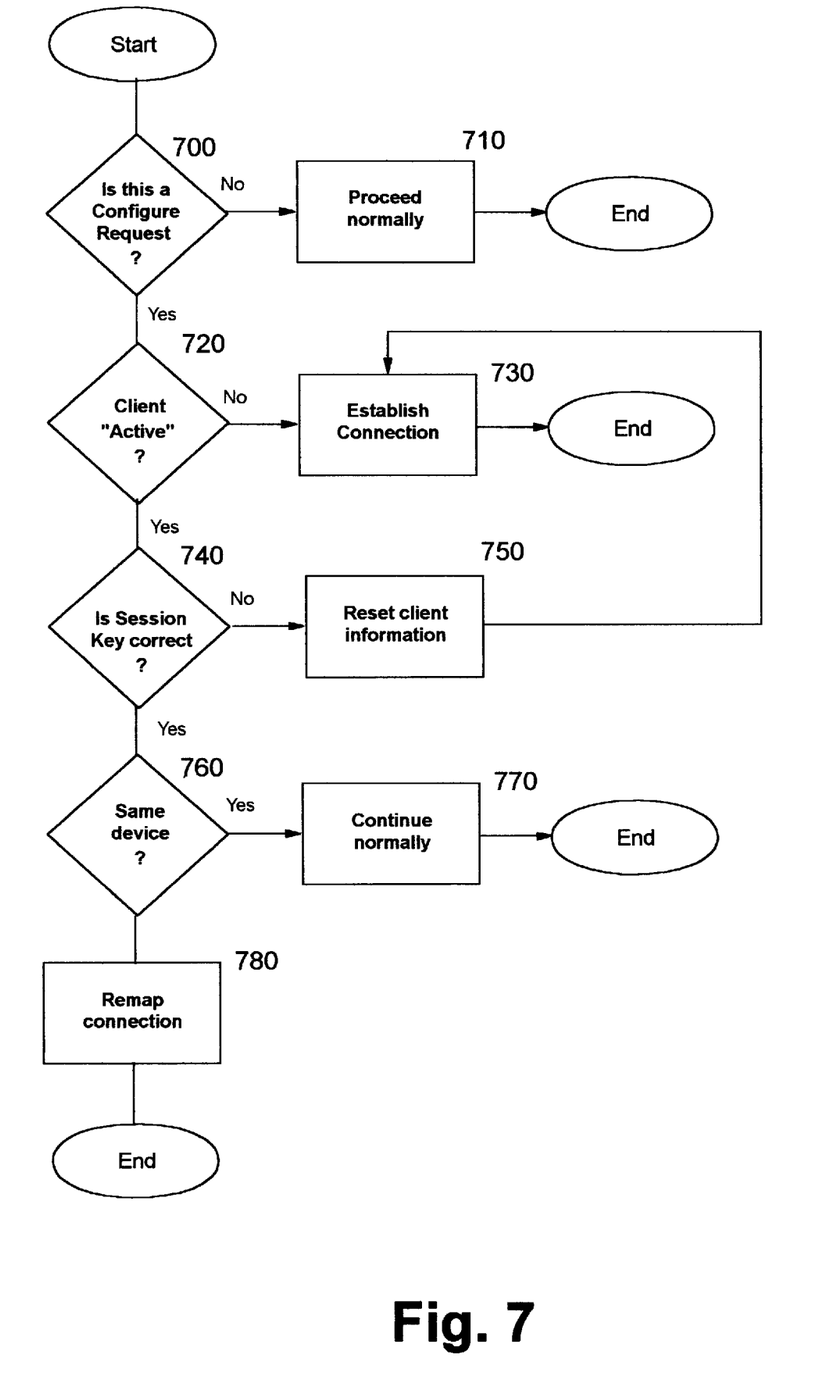
FIG. 7 illustrates a flow chart which sets forth the logic with which a preferred embodiment of the present invention in a gateway machine maintains a virtual connection across a subsequent physical connection.

FIG. 7 illustrates a flow chart which sets forth the logic with which a preferred embodiment of the present invention in a gateway machine maintains a virtual connection across a subsequent physical connection. The preferred embodiment of the present invention comprises sending control data from the client to the gateway when the client changes to a different subsequent physical connection (see Block 640, above). Accordingly, the logic of FIG. 7 is invoked whenever control data is received at the gateway. As stated previously, the present invention uses existing data, but changes the semantics of the control data so that this data is processed in a novel manner (as described with reference to FIGS. 6 and 7), enabling the virtual connection to be supported by multiple physical connections—all in a manner that is transparent to the user. Other data is processed using techniques which are well known in the art, and which do not form part of the present invention.

The process begins at Block 700, which checks to see whether the incoming message is a Configure Request. If not, then this data is not pertinent to the present invention: Block 710 indicates that the gateway process operates normally according to the PPP protocol and the application requirements, which may include discarding the incoming data. The process of FIG. 7 then ends.

Block 720 is reached when the incoming message is a Configure Request, and checks to see if the client sending the incoming message is considered "active" by the gateway. When this test has a negative response, Block 730 sets up a new physical and logical connection. This process uses techniques which are known in the art, and comprises performing any authentication that is required, followed by any negotiation (which may include negotiating the use of encryption and compression techniques), as well as exchanging the IP address to be used for communicating. The session key used by the present invention to identify the client to the gateway, which enables maintaining the virtual connection over a subsequent physical connection, is made known to both the client and gateway as part of the process of Block 730. Once these processes have completed successfully, the connection is set up and communication over a new session can begin. The process of FIG. 7 then ends.

Block 740 checks the session key contained in the network information portion of the Configure Request message, to determine if this is the same key that was used for this client previously. When this test has a negative response, the client is using a different session than the one being "remembered" by the gateway. For example, the client may have logged out of the prior session, unknown to the gateway, and is now creating a new session. Block 750 indicates that the gateway's information for the client must therefore be reset. Control transfers to Block 730 to set up a new connection to the client.

At Block 760, a recognized session key has been received. Block 760 asks whether this request is using the same device that was used in the prior communication with this client. If so, then communication continues normally, as shown by Block 770. Otherwise, when a different device is being used, Block 780 remaps the prior logical connection to this subsequent device. An identifier, such as the unique serial number burned into a modem, is sent by the client to the gateway as part of the connection establishment process. This identifier is used to identify the particular client session (and the information the gateway stores about that session, such as its current protocol state) which is using the modem (and similarly for other connection devices). When the client changes to a different medium, a different identifier will be transmitted. The remapping process of Block 780 associates this new identifier with the client information maintained by the gateway, enabling the session to continue transparently even though the medium has changed. Further, this remapping process may include changing to use of a different network protocol if the current physical connection is not of the same type used previously. The process of FIG. 7 then ends.

Figure 8A:
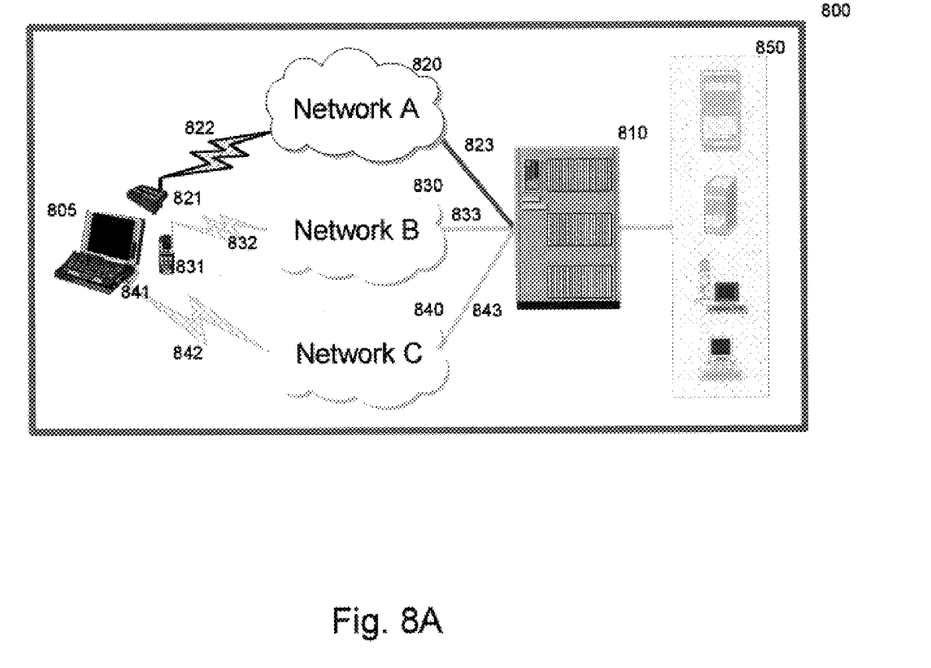
FIGS. 8A–8E depict an example of the GUI that may be used with the present invention, enabling the user to observe the physical connection in use (as well as alternative physical connections that may be available), and initiate changes thereto.

FIGS. 8A–8E illustrate a GUI 800 that may be used with the present invention, as previously stated. FIG. 8A depicts an example scenario where a client workstation 805 is connected to a gateway 810. As shown in these figures, Network A 820, Network B 830, and Network C 840 could be used to connect client 805 and gateway 810. This capability is shown in the GUI by the presence of multiple interface devices 821 (which may be an infrared radio transceiver), 831 (which may be a cellular phone), and 841 (which may be a CDPD card) for the workstation 805, and the links 822, 832, 842 from this workstation 805 to the respective networks 820, 830, 840. The networks then connect to the gateway 810 using links 823, 833, and 843, respectively. These figures also show a plurality of devices 850 attached to the gateway 810.

While FIGS. 8A–8E are rendered in shades of black and white, other known techniques (such as use of color, 3D affects, highlighting, shading, etc.) may be used in an actual implementation to differentiate connections based on their status. Preferably, existing GUI techniques (such as point-and-click selection capability with a mouse or other pointing device, drag-and-drop, etc.) will be fully integrated within the GUI 800, and the interface 800 will facilitate use without regard to the user's national language. Techniques for determining the information to be displayed for a particular workstation, and creating the graphical depiction thereof, are well known in the art.

FIG. 8A depicts Network A 820 and links 822, 823 as being currently used, as represented by the dark outline of link 822 (as contrasted to alternative links 832 and 842) and the darker line 823 (as contrasted to 833 and 843). This tells the user the current physical connection and path, i.e. the workstation 805 is using device 821 to connect using link 822 to Network A, which then uses link 823 to connect to gateway 810. Further, the user is reminded that alternative links 832, 833 through Network B, using device 831, and 842, 843 through Network C, using device 841, are available, by the presence of the corresponding graphical symbols. (Note that use of darker lines in these figures is for purposes of illustration only. Other visual indicators may be used equivalently.)

Figure 8B:
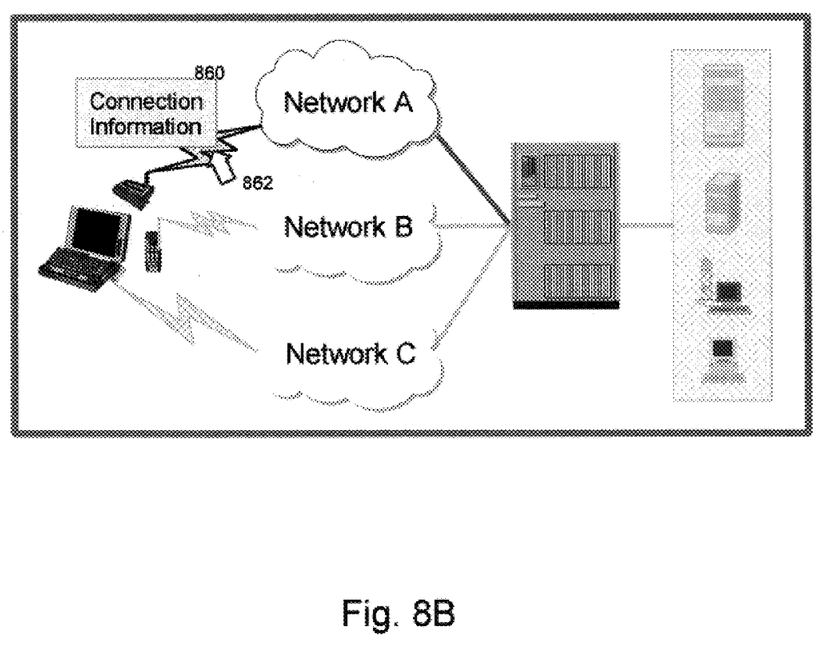

FIG. 8B depicts the capability for the user to select a portion of the graphical display, causing an information window 860 to be displayed. The window 860 contains information pertinent to the selected item. This selection capability may be implemented using a point-and-click technique, where arrow 862 indicates that the user selects link 822. Or, window 860 may automatically pop up in response to the user moving the pointing device over the corresponding object from the graphical display, etc. While FIG. 8B illustrates connection information being displayed for a selected link, any component (including nodes, physical connections, the virtual connection of the present invention, etc.) Defected in the GUI may be similarly selected for display of appropriate contextual information.

Figure 8C:
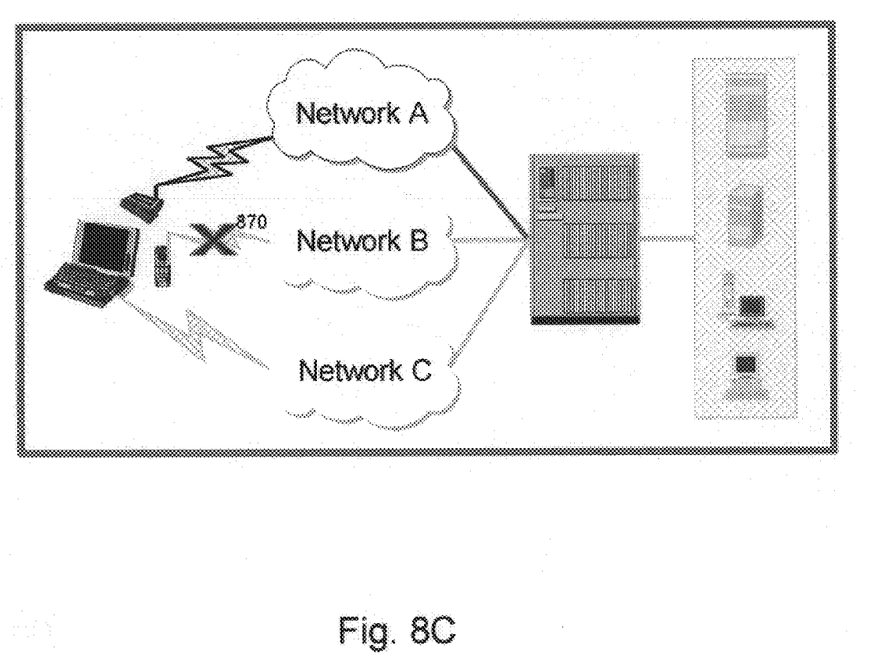

FIG. 8C represents to the user that, while the physical connection through Network A is currently being used, the physical connection through Network B 830 is no longer available as an alternative. The cellular phone 831 may be out of range, for example, making it unusable as an interface device. The unavailability of the connection through Network B may be represented by placing an "X" 870 through the link 832, or other similar indication that conveys this status. Network C remains shown as an available alternative.

Figure 8D:
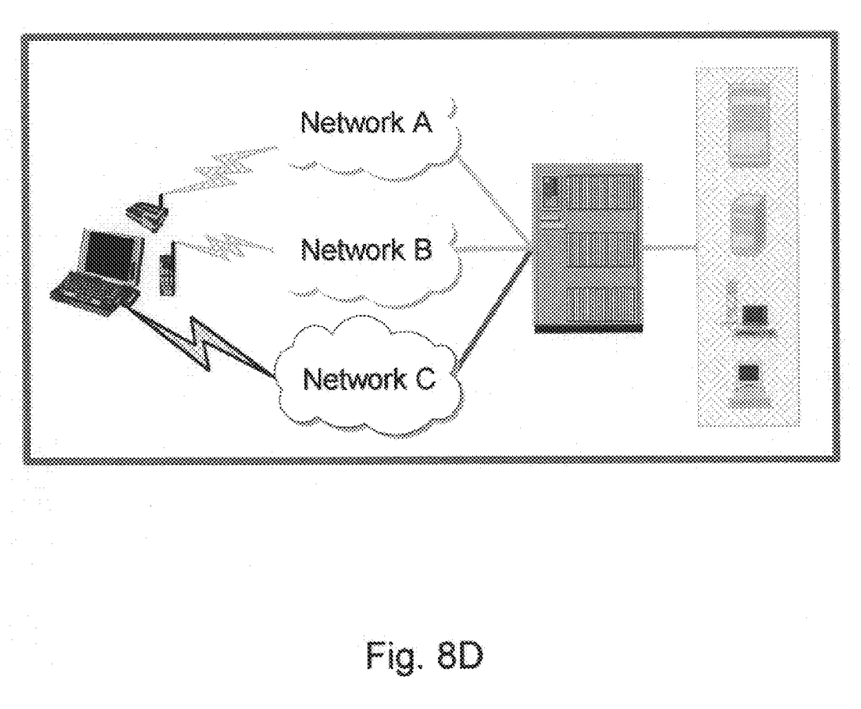

FIG. 8D shows how the user's request to change to an alternative available physical connection affects the display. By using any existing selection technique, the user may select link 842, indicating that he wishes to change to the network connection through Network C 840. (Optionally, the user may be requested to confirm this change before it is actually made, for example by presenting a pop-up window that reminds him that the physical connection will be changed, and asking him if he wishes to continue. Context-sensitive information may be provided to the user as well, such as suggesting whether a requested change seems advisable under existing conditions.) After making this change, the dark outline is now surrounding the graphical depiction of link 842 (instead of link 822), and the darker line at 843 shows that this link is now being used instead of link 823. Connections through Network A 820 and Network B 830 remain as available alternatives.

Figure 8E:
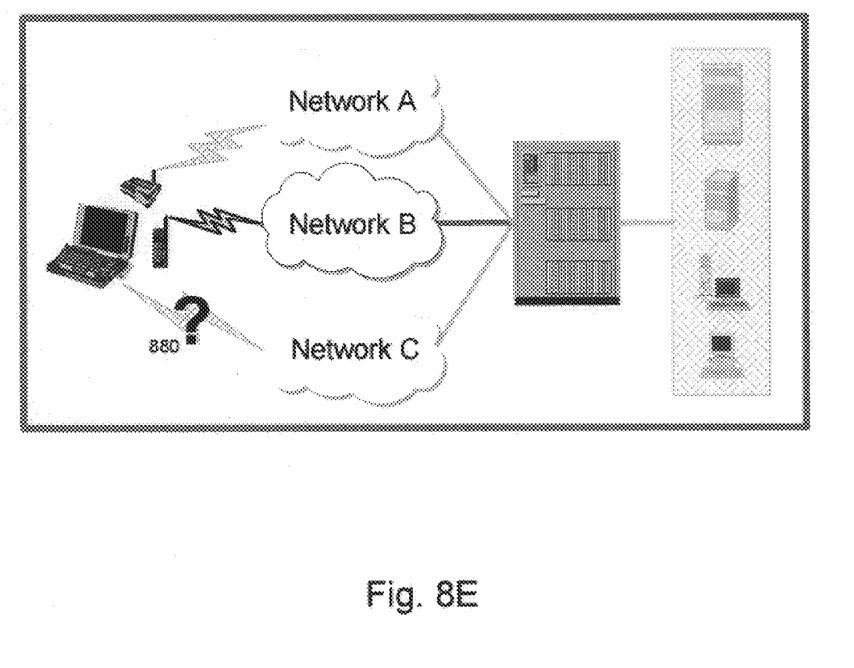

FIG. 8E shows a technique that may be used to indicate to the user that the status of a connection is unknown, and that it therefore may or may not be available for use. A question mark 880 is placed on the link 842 to convey this information to the user. Alternatively, other equivalent techniques may be used. (Note also that the connection through Network B 830 is now shown as being in use, with connections through Networks A 820 and C 840 being shown as available.)

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code embodied on computer readable media and readable by a computer system in said environment, for maintaining a virtual connection between a client and a gateway across multiple physical connections, comprising:

a subprocess for establishing a first physical connection from said client to said gateway using a first of at least one available connection media and a first of at least one available connection devices;

a subprocess for establishing a second physical connection from said client to said gateway using a second of said connection media and a second of said connection devices, wherein at least one of said second medium and said second connection device is different from said first medium and said first connection device; and a subprocess for maintaining a logical connection between said client and said gateway, wherein said logical connection is initially supported by said first physical connection and then by said second physical connection.

2. Computer readable code for maintaining a virtual connection between a client and a gateway across multiple physical connections according to claim 1, wherein said subprocess for maintaining a logical connection further comprises:

a subprocess in said client for sending a session key to said gateway using said second physical connection, wherein said session key identifies said logical connection and was created when using said first physical connection; and a subprocess in said gateway for receiving said session key, and detecting said receipt as a request to continue said logical connection.

3. Computer readable code for maintaining a virtual connection between a client and a gateway across multiple physical connections according to claim 1, further comprising a subprocess for displaying a graphical user interface which depicts: a graphical representation of said client and said gateway, said available connection media, and said available connection devices; a status of each of said media and said devices; and an indication of which of said media and said devices is currently in use.

4. Computer readable code for maintaining a virtual connection between a client and a gateway across multiple physical connections according to claim 2, wherein said second physical connection is established in response to a disruption or failure of said first physical connection.

5. Computer readable code for maintaining a virtual connection between a client and a gateway across multiple physical connections according to claim 2, wherein said second physical connection is established in response to detection of a better connection choice than said first physical connection.

6. Computer readable code for maintaining a virtual connection between a client and a gateway across multiple physical connections according to claim 3, wherein said second physical connection is established in response to a request by a user, said request being initiated by a subprocess responsive to user input from said graphical user interface.

7. A system for maintaining a virtual connection between a client and a gateway across multiple physical connections in a computing environment capable of having a connection to a network, said system comprising:

means for establishing a first physical connection from said client to said gateway using a first of at least one available connection media and a first of at least one available connection device;

means for establishing a second physical connection from said client to said gateway using a second of said connection media and a second of said connection devices, wherein at least one of said second medium and said second connection device is different from said first medium and said first connection device; and means for maintaining a logical connection between said client and said gateway, wherein said logical connection is initially supported by said first physical connection and then by said second physical connection.

8. The system for maintaining a virtual connection between a client and a gateway across multiple physical connections according to claim 7, wherein said means for maintaining a logical connection further comprises:

means in said client for sending a session key to said gateway using said second physical connection, wherein said session key identifies said logical connection and was created when using said first physical connection; and means in said gateway for receiving said session key, and detecting said receipt as a request to continue said logical connection.

9. The system for maintaining a virtual connection between a client and a gateway across multiple physical connections according to claim 7, further comprising means for displaying a graphical user interface which depicts: a graphical representation of said client and said gateway, said available connection media, and said available connection devices; a status of each of said media and said devices; and an indication of which of said media and said devices is currently in use.

10. The system for maintaining a virtual connection between a client and a gateway across multiple physical connections according to claim 8, wherein said second physical connection is established in response to a disruption or failure of said first physical connection.

11. The system for maintaining a virtual connection between a client and a gateway across multiple physical connections according to claim 8, wherein said second physical connection is established in response to detection of a better connection choice than said first physical connection.

12. The system for maintaining a virtual connection between a client and a gateway across multiple physical connections according to claim 9, wherein said second physical connection is established in response to a request by a user, said request being initiated by means responsive to user input from said graphical user interface.

13. A method of maintaining a virtual connection between a client and a gateway across multiple physical connections in a computing environment capable of having a connection to a network, said method comprising the steps of:

establishing a first physical connection from said client to said gateway using a first of at least one available connection media and a first of at least one available connection device;

establishing a second physical connection from said client to said gateway using a second of said connection media and a second of said connection devices, wherein at least one of said second medium and said second connection device is different from said first medium and said first connection device; and maintaining a logical connection between said client and said gateway, wherein said logical connection is initially supported by said first physical connection and then by said second physical connection.

14. The method for maintaining a virtual connection between a client and a gateway across multiple physical connections according to claim 13, wherein said maintaining a logical connection step further comprises:

sending a session key from said client to said gateway using said second physical connection, wherein said session key identifies said logical connection and was created when using said first physical connection; and receiving said session key in said gateway, and detecting said receipt as a request to continue said logical connection.

15. The method for maintaining a virtual connection between a client and a gateway across multiple physical connections according to claim 13, further comprising a step for displaying a graphical user interface which depicts: a graphical representation of said client and said gateway, said available connection media, and said available connection devices; a status of each of said media and said devices; and an indication of which of said media and said devices is currently in use.

16. The method for maintaining a virtual connection between a client and a gateway across multiple physical connections according to claim 14, wherein said second physical connection is established in response to a disruption or failure of said first physical connection.

17. The method for maintaining a virtual connection between a client and a gateway across multiple physical connections according to claim 14, wherein said second physical connection is established in response to detection of a better connection choice than said first physical connection.

18. The method for maintaining a virtual connection between a client and a gateway across multiple physical connections according to claim 15, wherein said second physical connection is established in response to a request by a user, said request being initiated by a step responsive to user input from said graphical user interface.

* * * * *